US012750895B2

(12) United States Patent
Sakagami et al.

(10) Patent No.: US 12,750,895 B2
(45) Date of Patent: Sep. 29, 2026

(54) RECORDING MEDIUM RECORDING PROGRAM EXECUTED ON MOBILE COMMUNICATION TERMINAL THAT COMMUNICATES WITH WATER HEATER, AND WATER HEATER

(71) Applicant: NORITZ CORPORATION, Hyogo (JP)

(72) Inventors: Daiki Sakagami, Hyogo (JP); Eiji Kanki, Hyogo (JP); Shinichi Okamoto, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 262 days.

(21) Appl. No.: 18/655,301

(22) Filed: May 5, 2024

(65) Prior Publication Data

US 2024/0389165 A1 Nov. 21, 2024

(30) Foreign Application Priority Data

May 19, 2023 (JP) ................................ 2023-083317

(51) Int. Cl.
*H04W 76/10* (2018.01)
*H04W 12/06* (2021.01)

(52) U.S. Cl.
CPC ........... *H04W 76/10* (2018.02); *H04W 12/06* (2013.01)

(58) Field of Classification Search
CPC .............................. H04W 76/10; H04W 12/06
USPC ........................................................ 455/411
See application file for complete search history.

(56) References Cited

U.S. PATENT DOCUMENTS

2019/0162425 A1* 5/2019 Maekawa ........... F24D 19/1051
2023/0163991 A1* 5/2023 Situ ..................... H04L 12/2807
709/224

FOREIGN PATENT DOCUMENTS

JP 2018156182 10/2018
JP 2020095650 6/2020
JP 2020095650 A * 6/2020

* cited by examiner

*Primary Examiner* — Michael R Neff
(74) *Attorney, Agent, or Firm* — JCIPRNET

(57) ABSTRACT

A process executed by a mobile communication terminal and water heaters and, which are capable of performing near field wireless communication, includes: a step in which the mobile communication terminal scans a BLE device (S215); a step in which a list of water heaters are displayed (S225); a step in which the mobile communication terminal generates connection data (S240); a step in which the mobile communication terminal transmits the connection data to the water heaters (S245); a step in which the water heaters receive the connection data (S250); a step in which the mobile communication terminal displays an operation screen for the water heater to which the connection has been completed (S285) when the connection data transmitted to the water heater and the input connection data match (YES in step S270); and a step in which the mobile communication terminal communicates with the water heater (S290).

3 Claims, 5 Drawing Sheets

RECORDING MEDIUM RECORDING PROGRAM EXECUTED ON MOBILE COMMUNICATION TERMINAL THAT COMMUNICATES WITH WATER HEATER, AND WATER HEATER

CROSS-REFERENCE TO RELATED APPLICATION

This application claims the priority benefits of Japanese application no. 2023-083317, filed on May 19, 2023. The entity of the above-mentioned patent application is hereby incorporated by reference herein and made a part of this s specification.

BACKGROUND

Technical Field

The present disclosure relates to a water heater, and more particularly, to a connection between a communication terminal for controlling the water heater and the water heater.

Related Art

Conventionally, water heaters that may be paired with communication terminals such as smartphones through near field communication (NFC) such as Bluetooth (registered trademark) are known.

For example, Japanese Patent Application Laid-Open No. 2020-95650 (Patent Document 1) discloses "a hot water system and program that may smoothly and easily pair a hot water device with a mobile terminal device while ensuring security even if the hot water device to be remotely controlled is located far away from the home (see [Summary])".

In addition, Japanese Patent Application Laid-Open No. 2018-156182 (Patent Document 2) discloses "an authentication system that allows an authentication procedure to be performed from any location far away from the operated device to enable the operation of the operated device by a communication terminal (see [Summary])".

A plurality of water heaters may be configured close to each other in a narrow area. In such a case, when the communication terminal would like to pair with an arbitrary water heater, since each water heater outputs NFC signals, the communication terminal may not be able to pair with such arbitrary water heater if the communication terminal receives signals output from other water heaters first. Thus, there is a need for a technology for pairing with an arbitrary water heater.

The disclosure has been made in view of the above-mentioned background and provides a technology that enables pairing with an arbitrary water heater.

SUMMARY

According to one embodiment, a non-transient computer-readable recording medium, recording a program executed on a mobile communication terminal communicating with one or more water heaters capable of displaying information is provided. The program includes receiving a signal broadcast from each of the one or more water heaters; displaying the one or more water heaters as connection destination candidates on a monitor of the mobile communication terminal based on the signal; accepting a selection of any one of the one or more water heaters; transmitting authentication information for establishing communication to the selected water heater and displaying the authentication information on the water heater; accepting input of the authentication information; and establishing communication between the selected water heater and the mobile communication terminal based on the input authentication information and the authentication information transmitted to the water heater matching.

According to another embodiment, a water heater is provided. The water heater includes a transmitter for transmitting a broadcast signal including recognition information specifying the water heater; a receiver for receiving authentication information for establishing a communication connection between the water heater specified by the recognition information and the mobile communication terminal from the mobile communication terminal that has received the broadcast signal; a display for displaying the authentication information; and a controller for controlling an operation of the water heater based on an establishment of a communication connection with the mobile communication terminal.

DESCRIPTION OF THE EMBODIMENTS

Figure 1:
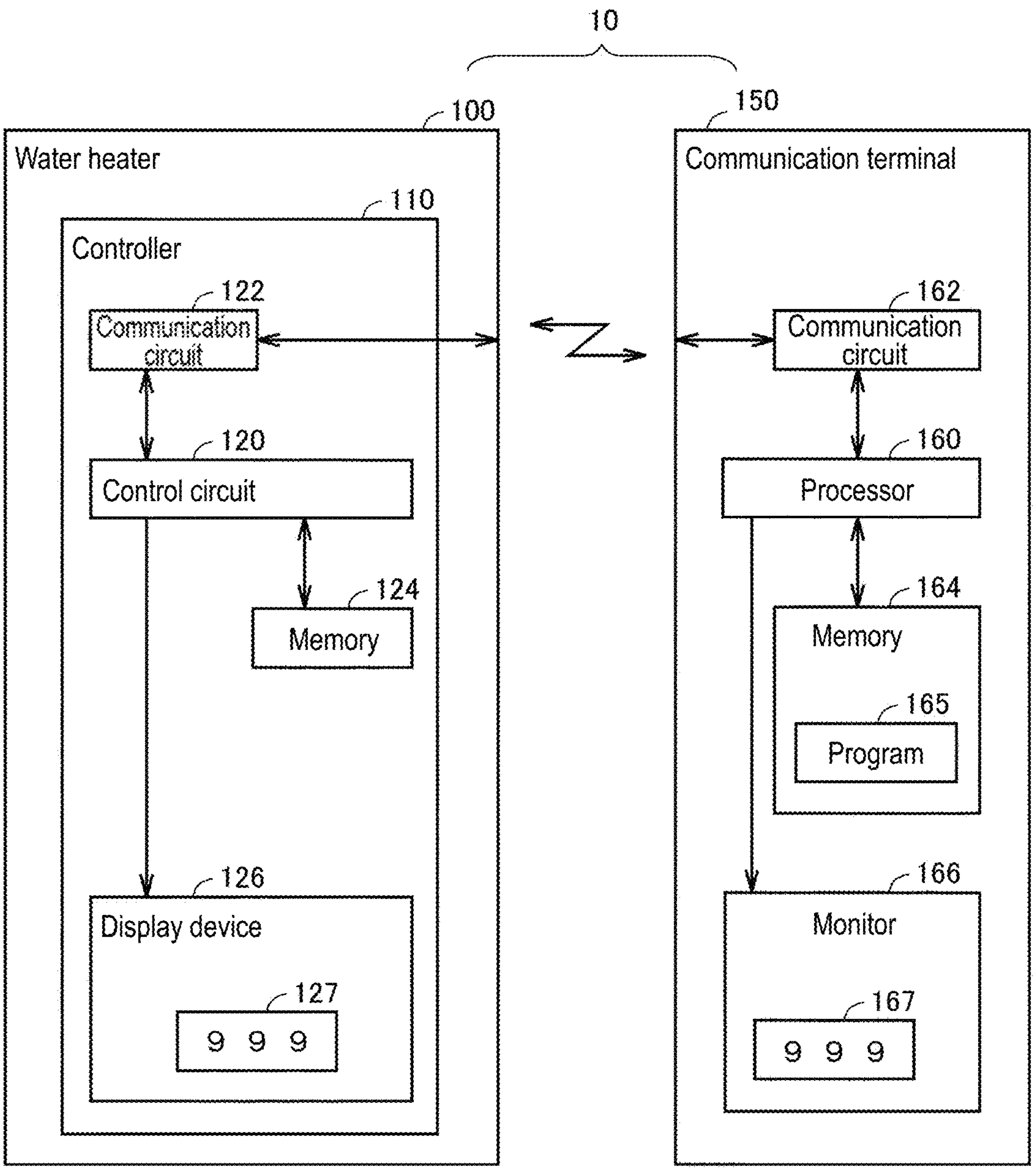
FIG. 1 is a block diagram schematically illustrating the configuration of the water heater 100 and the mobile communication terminal 150 that form the hot water system 10.

The embodiment of the disclosure will be described below with reference to the drawings. In the following description, the same parts will be denoted by the same reference numerals. They also have the same names and functions. Thus, detailed description of these parts and components will not be repeated.

According to one aspect, receiving the signal includes receiving the signal through a filter that limits connection destinations of the mobile communication terminal.

In one aspect, the non-transient computer-readable recording medium recording the program further causes the mobile communication terminal to execute prompting the mobile communication terminal to connect with the one or more water heaters after communication with the water heater with which communication has been established is cut off.

According to another aspect, pairing with an arbitrary water heater is possible. These and other objects, features, aspects, and advantages of the disclosure are apparent from the following detailed description of the disclosure, taken in conjunction with the accompanying drawings.

Referring to FIG. 1, a hot water system 10 according to this embodiment will be described. FIG. 1 is a block diagram schematically illustrating the configuration of the water heater 100 and the mobile communication terminal 150 that form the hot water system 10.

[Water Heater]

The water heater 100 includes a controller 110 that controls the operation of the water heater 100. The controller 110 includes a control circuit 120, a communication circuit 122, a memory 124, and a display device 126. The control circuit 120 controls communication between the water heater 100 and the mobile communication terminal 150.

In one aspect, the communication circuit 122 transmits a signal including recognition information (e.g., serial number, model number) that specifies the water heater 100 as a transmitter. The form of transmission is so-called broadcast transmission. When the communication format of the communication circuit 122 is Bluetooth, the communication circuit 122 transmits an advertisement signal including the recognition information. In another aspect, the communication circuit 122 receives a signal transmitted from the mobile communication terminal 150 or other communication device as a receiver. It is noted that the communication format is not limited to Bluetooth, and other near field communication formats may be used.

The memory 124 holds recognition information that specifies the water heater 100. The display device 126 includes a region 127 that displays numbers, characters, and other information. For example, the display device 126 is implemented by a 7-segment display. In one aspect, the display device 126 displays connection data (authentication information) included in the signal received by the communication circuit 122 in the region 127. The displayed information includes the number generated by the mobile communication terminal 150, but other information may also be displayed. The number is, for example, a three-digit number, but a number of two or fewer digits or four or more digits may also be displayed in the region 127.

[Mobile Communication Terminal]

The mobile communication terminal 150 may be either a dedicated mobile communication terminal or a general-purpose mobile communication terminal. In the following description, it is assumed that the mobile communication terminal 150 according to this embodiment is a general-purpose mobile communication terminal such as a so-called smartphone or a tablet terminal.

The mobile communication terminal 150 includes a processor 160 that executes a program, a communication circuit 162, a memory 164 that stores the program, and a monitor 166.

The processor 160 controls the operation of the mobile communication terminal 150 by executing the program read from the memory 164.

The memory 164 may include flash memory or other nonvolatile memory, and RAM (Random Access Memory) or other volatile memory. The memory 164 holds a program 165 for the mobile communication terminal 150 to control the water heater. The memory 164 may also hold connection data (authentication information) for establishing a connection between the mobile communication terminal 150 and the water heater.

The communication circuit 162 communicates with the water heater 100 under the control of the processor 160. The communication format of the communication circuit 162 is, for example, Bluetooth (registered trademark) or other near field communication formats, but other communication formats may also be employed.

The monitor 166 is, for example, a touch panel type monitor. The monitor is realized by a liquid crystal or organic EL (electro luminescence) monitor. In one aspect, the monitor 166 accepts a touch operation by a user of the mobile communication terminal 150. In another aspect, the monitor 166 displays one or more water heaters as connection destination candidates based on a signal broadcast from each of the one or more water heaters. In another aspect, the monitor 166 displays a region 167 that accepts input of authentication information that controls the connection with the water heater 100. The region 167 accepts input of, for example, numbers, symbols, and other data.

In the example of FIG. 1, the display device 126 of the water heater 100 displays a three-digit number "999" in the region 127 as the authentication information. Furthermore, the mobile communication terminal 150 shows that the three-digit number 999 was input into the region 167 by the user who visually recognized the connection data. It is noted that the authentication information displayed in the region 127 and the authentication information input to the region 167 are not limited to those illustrated in FIG. 1.

[Control Structure]

Figure 2:
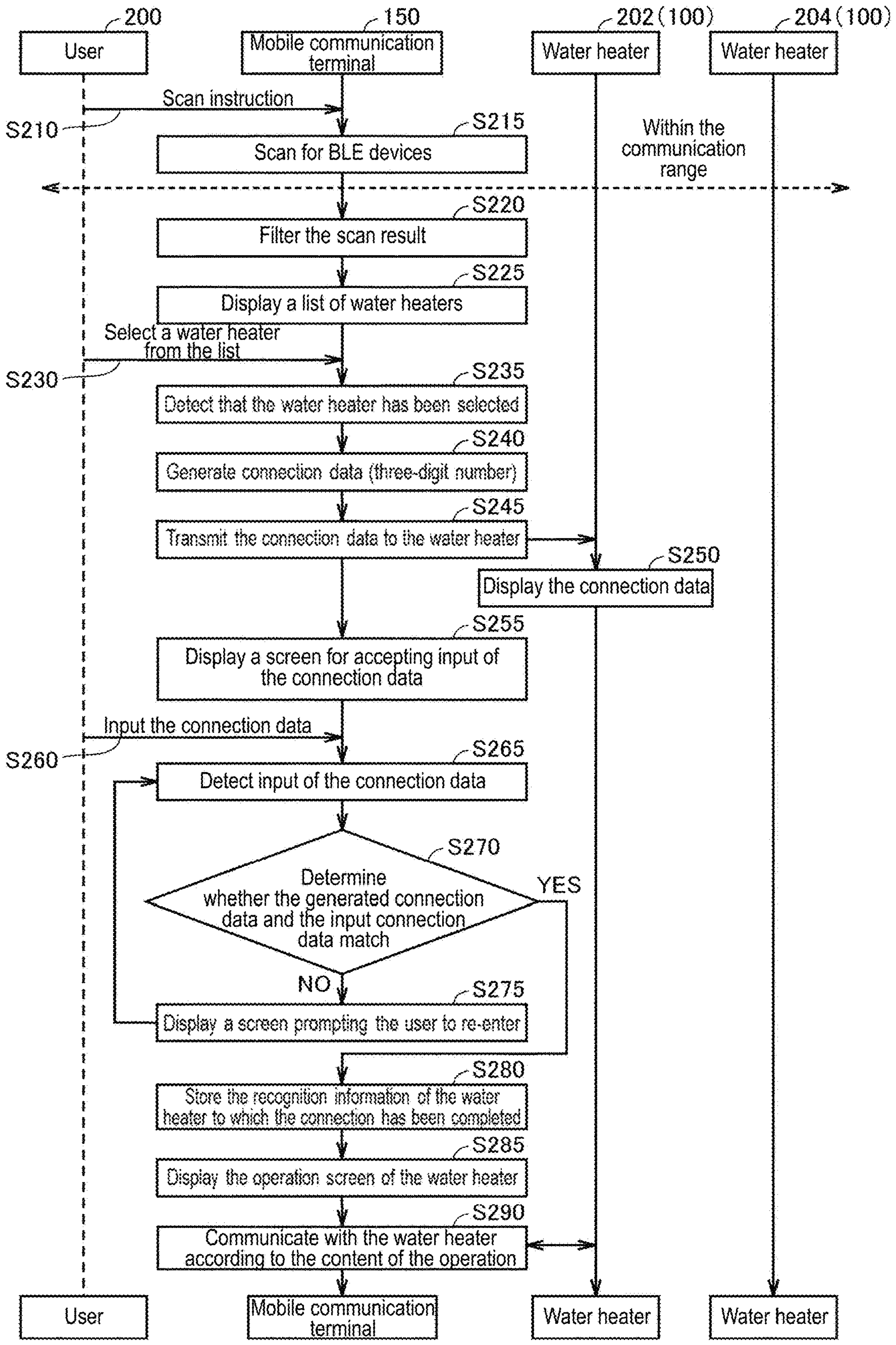
FIG. 2 is a flowchart showing a part of the procedure of the process performed when a user of the mobile communication terminal 150 establishes a connection between one of a plurality of water heaters and the mobile communication terminal 150.

The connection between the water heater 100 and the mobile communication terminal 150 according to this embodiment will be described with reference to FIG. 2 and FIG. 3. FIG. 2 is a flowchart showing a part of the procedure of the process performed when a user of the mobile communication terminal 150 establishes a connection between one of a plurality of water heaters and the mobile communication terminal 150.

In step S210, the user 200 operates the mobile communication terminal 150 to instruct scanning in a near field communication format.

In step S215, the processor 160 of the mobile communication terminal 150 drives the communication circuit 162 to scan for Bluetooth Low Energy (BLE) devices in response to the scan instruction. For example, in the case where the mobile communication terminal 150 is in a range that is possible to communicate with a plurality of water heaters 202 and 204, any of the water heaters 202 and 204 may be scanned. In addition, other electronic devices with BLE functionality may also be scanned.

In step S220, the processor 160 filters the scan results and extracts only those of the water heaters 202 and 204 using information that distinguishes the water heaters from among the information included in the signals received from the water heaters 202 and 204 and other electronic devices having the BLE function.

In step S225, the processor 160 displays a list of water heaters 202 and 204 on the monitor 166 as a list of water heaters available for connection as a result of the filtering. The user 200 may select a water heater to establish a connection with the mobile communication terminal 150 while viewing the list.

In step S230, the processor 160 accepts a touch operation by the user 200 to select a water heater from the list.

In step S235, the processor 160 detects that the water heater 202 has been selected based on the touch operation.

In step S240, the processor 160 generates a three-digit number as connection data for establishing a communication connection with the water heater 202. The connection data is used as authentication information by the mobile communication terminal 150 and each water heater. The processor 160 stores the generated connection data in the memory

164. In one aspect, the processor 160 generates the three-digit number using a random number generator. In another aspect, the processor 160 may read out any one of a plurality of three-digit numbers prepared in advance in a program that communicates with the water heater. The connection data is not limited to a three-digit number, but may be two digits or less, or four digits or more. Further, the connection data is not limited to number, and symbols or characters (e.g., alphabets, hiragana) may be used.

In step S245, the processor 160 transmits the connection data. In some aspects, the connection data is transmitted along with the recognition information of the water heater 202. When the plurality of water heaters 202 and 204 receive the connection data, the water heater 202 specified by the recognition information adopts the received data, and the other water heater 204 discard the data without processing the same.

In step S250, the water heater 202 displays the connection data (three-digit number) received from the mobile communication terminal 150.

In step S255, the mobile communication terminal 150 displays on the monitor 166 a screen for accepting input of the connection data.

In step S260, when the user 200 visually recognizes the three-digit number displayed on water heater 202, the user 200 inputs the three-digit number into a predetermined region on the screen displayed on the monitor 166.

In step S265, the processor 160 detects input of the connection data. In step S270, the processor 160 determines whether the generated connection data (step S240) and the input connection data (step S265) match. In the case where the processor 160 determines that these connection data match (YES in step S270), it switches control to step S280. If not (NO in step S270), the processor 160 switches control to step S275.

In step S275, the processor 160 determines that the input connection data is incorrect and displays a screen on the monitor 166 prompting the user to re-enter the connection data.

In step S280, the processor 160 stores the recognition information of the water heater 202 to which the connection has been completed in the memory 164.

In step S285, the processor 160 reads data for screen display from the memory 164 and displays the operation screen of the water heater 202 on the monitor 166.

In step S290, the mobile communication terminal 150 communicates with the water heater 202 and controls the operation of the water heater 202 according to the content of the operation by the user 200. The controlled operations may include, for example, displaying or changing the set temperature, and other operations controlled by a dedicated remote control of the water heater 202.

Figure 3:
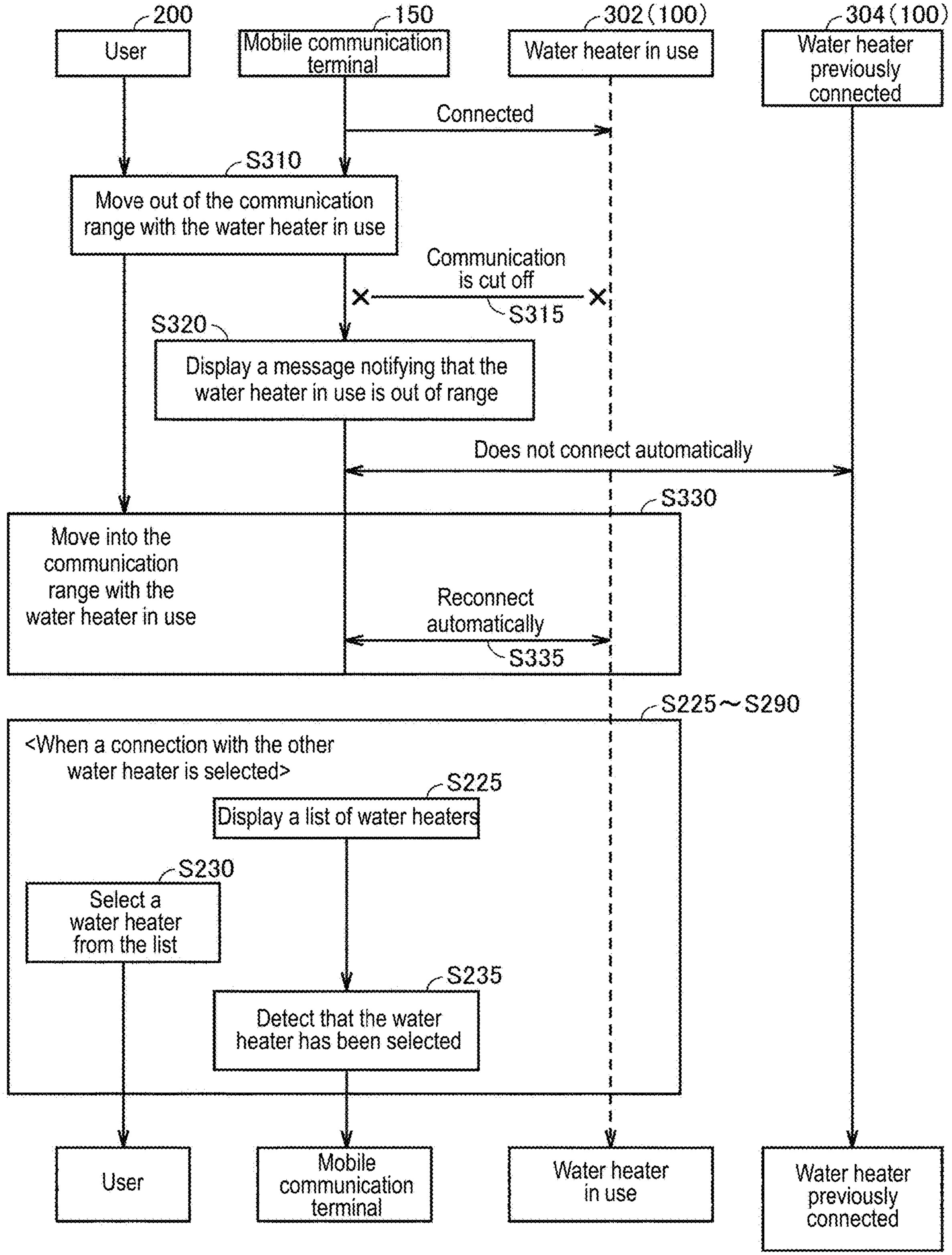
FIG. 3 is a flowchart showing a part of the procedure of the process that may be performed after the connection is cut off due to the mobile communication terminal 150 having established a connection with the water heater moving away from the water heater.

FIG. 3 is a flowchart showing a part of the procedure of the process that may be performed after the connection is cut off due to the mobile communication terminal 150 having established a connection with the water heater moving away from the water heater. In the following description, the description is given on the assumption that the mobile communication terminal 150 and the water heater 302 are in communication connection, and the mobile communication terminal 150 and the water heater 304 have been in communication connection previously.

In step S310, the user 200 holding the mobile communication terminal 150 moves out of the range where near field wireless communication with the water heater 302 is possible.

In step S315, the processor 160 of the mobile communication terminal 150 detects that communication with the water heater 302 has been cut off.

In step S320, the processor 160 displays a message on the monitor 166 notifying that the water heater 302 in use is out of range. At this time, the mobile communication terminal 150 does not automatically connect to another water heater 304 to which it has been connected previously, even if the water heater 304 exists within the range where the near field wireless communication is possible.

In step S330, when the user 200 moves again into the range where the near field wireless communication with the water heater 302 in use is possible, the mobile communication terminal 150 detects that the user 200 is within the range where the near field wireless communication with the water heater 302 in use is possible.

In step S335, the mobile communication terminal 150 automatically reconnects to the water heater 302. For example, the mobile communication terminal 150 confirms, based on the communication history stored in the memory 164, that the water heater last connected was the water heater 302, and then connects to the water heater 302. It is noted that the time during which this reconnection is possible may be limited to a predetermined time after the connection between the mobile communication terminal 150 and the water heater in use is cut off. This time may be set in advance, for example, 30 minutes or one hour, or may be a time that is arbitrarily input by the user of the mobile communication terminal 150.

In addition, in another aspect, when the user 200 holding the mobile communication terminal 150 leaves the range that is possible to communicate with the water heater 302 in use and moves into the range that is possible to communicate with another water heater, the mobile communication terminal 150 may execute the process of steps S225 to S290 described above and establish a communication connection with the other water heater.

[Display Screen]

Figure 4A:
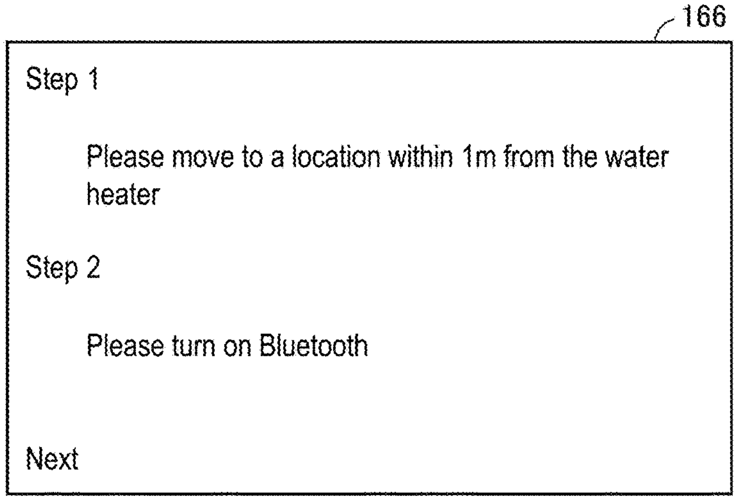
FIG. 4A, FIG. 4B, and FIG. 4C are diagrams showing the transition of screens displayed on the monitor 166 when the mobile communication terminal 150 establishes a communication connection with the water heater.
Figure 4B:
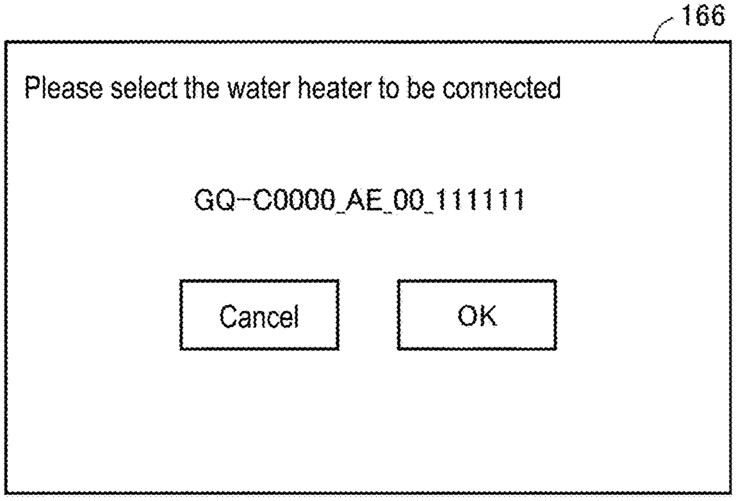
Figure 4C:
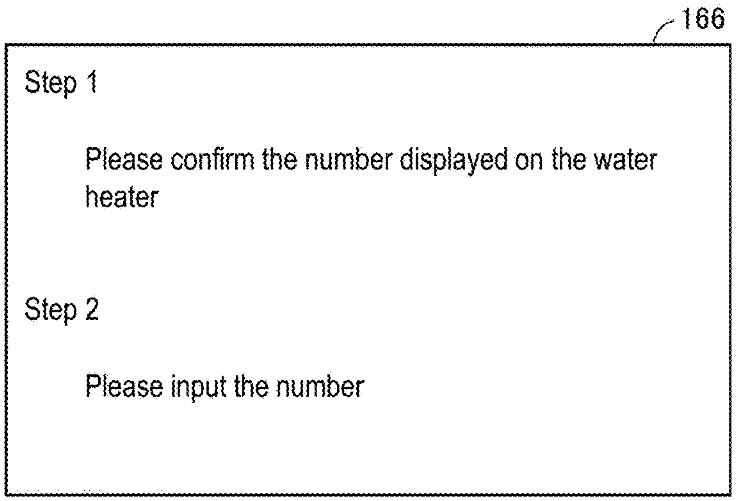

The display mode of the screen by the mobile communication terminal 150 will be described with reference to FIG. 4A, FIG. 4B, and FIG. 4C and FIG. 5A and FIG. 5B. FIG. 4A, FIG. 4B, and FIG. 4C are diagrams showing the transition of screens displayed on the monitor 166 when the mobile communication terminal 150 establishes a communication connection with the water heater.

The screen in FIG. 4A is displayed on the monitor 166 when the user 200 operates the mobile communication terminal 150 to start an application program (so-called app) for controlling the water heater. In the case where the mobile communication terminal 150 is not within the range where near field wireless communication with the water heater is possible, the monitor 166 displays a message, for example, “Please move to a location within 1 m from the water heater”, prompting the user to move the mobile communication terminal 150 into the range where near field wireless communication is possible. Further, in the case where the Bluetooth communication function is not turned on, the monitor 166 displays a message prompting the user to turn on the Bluetooth communication function.

Afterwards, when the mobile communication terminal 150 communicates with one or more water heaters, the monitor 166 displays the water heaters that are available for communication connection, as shown in the screen in FIG. 4B (step S222). At this time, in the case where the electronic device other than the water heater has the Bluetooth communication function, the mobile communication terminal 150 uses the recognition information of the water heater to extract only the water heater from the devices that are available for communication and displays the same on the monitor 166 (step S220). When the user 200 selects the water heater, the mobile communication terminal 150 transmits connection data to the water heater. The water heater displays the connection data (e.g., three-digit number 999) received from the mobile communication terminal 150 on the display device 126 (step S250).

When the mobile communication terminal 150 detects the selection of the water heater, a message is displayed on the monitor 166 to prompt the user to check the number displayed on the water heater and to input the number, as shown on the screen in FIG. 4C (step S255). In the case where the input connection data matches the connection data displayed on the water heater, a communication connection between the mobile communication terminal 150 and the water heater is established.

Figure 5A:
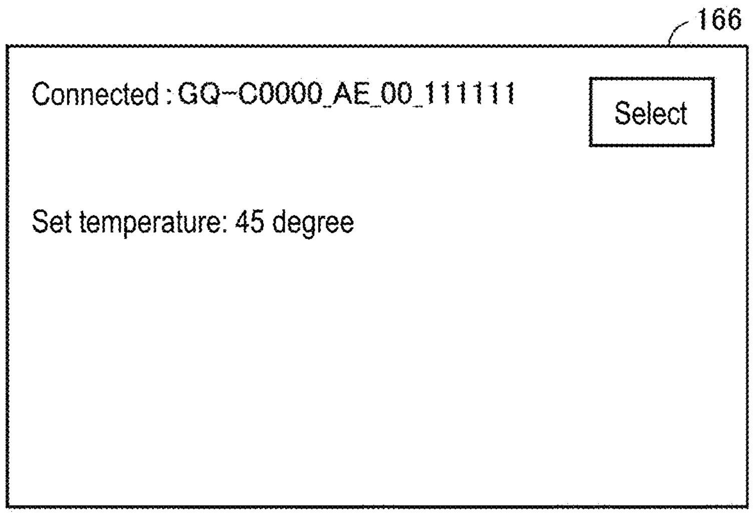
FIG. 5A and FIG. 5B are diagrams showing the screens displayed on the monitor 166 when the mobile communication terminal 150, which has already been connected to the water heater, moves out of the communication range and then moves back into the range that is possible to communicate with the water heater.
Figure 5B:
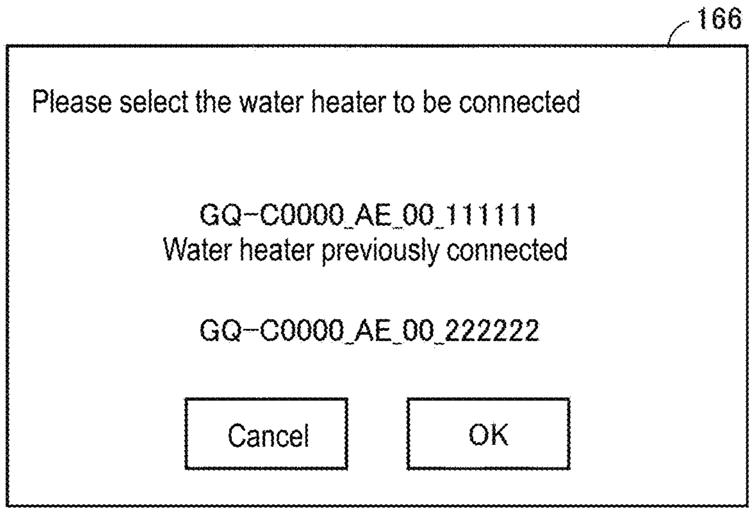

FIG. 5A and FIG. 5B are diagrams showing the screens displayed on the monitor 166 when the mobile communication terminal 150, which has already been connected to the water heater, moves out of the communication range and then moves back into the range that is possible to communicate with the water heater.

The screen in FIG. 5A illustrates one water heater available for connection. Afterwards, when the user 200 moves out of the range where the near field wireless communication between the mobile communication terminal 150 and the water heater is possible, the communication connection with the water heater is cut off, but the mobile communication terminal 150 holds the information of the water heater in the memory 164.

After that, when the user moves within the range that is possible to communicate with two water heaters, the monitor 166 displays a list of water heaters that are available for connection, in addition to the water heaters that were connected previously, as well as other water heaters that are currently available for connection, as shown in the screen in FIG. 5B. When the user selects a connection with another water heater that is currently available for connection as a new water heater, the mobile communication terminal 150 starts a communication connection with the other water heater (steps S225 to S290).

It is noted that the above-described embodiment exemplifies a mode in which the mobile communication terminal 150 communicates with each of a plurality of advertising water heaters. The establishment of the communication connection is not limited to this mode. For example, any one of the plurality of water heaters may function like the mobile communication terminal 150 to establish a communication connection between the mobile communication terminal 150 and the water heater. In this case, any one of the plurality of water heaters operates as a master, and the remaining water heaters operate as slaves. The master or slave setting may be set to either by the user in advance, or data indicating that the water heater, which first establishes a connection with the mobile communication terminal 150, is a master may be stored in the memory 164 of the water heater so that the water heater operates as the master.

In a multi-hot water system configured so that a plurality of water heaters may cooperate through mutual communication to perform high-capacity hot water heating operation, among the plurality of water heaters, the control unit of one water heater is configured to take charge of controlling the hot water system as a whole. A water heater that has a control unit configured to control the hot water system as a whole is defined as a master water heater, and the other water heater is defined as a slave water heater. This multi-hot water system may use the master water heater as a master for establishing a communication connection between the mobile communication terminal 150 and the water heater, and may use the slave water heater as a slave for establishing a communication connection between the mobile communication terminal 150 and the water heater.

As an example, when the connection between the first water heater of the two water heaters and the mobile communication terminal 150 is established, the user 200 may desire a communication connection with the second water heater of the two water heaters. In this case, the mobile communication terminal 150 displays the first water heater and the second water heater as a list of water heaters that is capable of communicating with the monitor 166.

When the user 200 selects a connection with the second water heater, the mobile communication terminal 150 first notifies the first water heater of the selection. In response to the notification, the first water heater acting as the master transmits an advertisement execution command based on the Bluetooth communication function to the second water heater. In response to the execution command, the second water heater performs advertising, and also turns on the Bluetooth communication function and notifies the first water heater that advertising is being performed.

The first water heater notifies the mobile communication terminal 150 that connection with the second water heater is now available. The mobile communication terminal 150 displays a message to that effect on the monitor 166.

When the user 200 instructs to start a connection with the second water heater, the mobile communication terminal 150 executes the connection process described above (steps S225 to S290) with the second water heater.

As described above, according to this embodiment, even if a plurality of water heaters are configured close to each other, the mobile communication terminal may be paired with an arbitrary water heater using NFC.

The embodiments disclosed herein are exemplary and should not be construed restrictive in all aspects. The scope of the disclosure is defined by the claims instead of the above descriptions, and it is intended to include the equivalent of the scope of the claims and all modifications within the scope.

INDUSTRIAL APPLICABILITY

The disclosed technical idea is applicable to a plurality of water heaters configured close to each other.

What is claimed is:

1. A non-transitory computer-readable recording medium, recording a program executed on a mobile communication terminal communicating with one or more water heaters capable of displaying information, the program comprising:

- scanning a plurality of electronic devices including the one or more water heaters in response to a scan instruction using near field wireless communication;
- receiving signals broadcast from a plurality of electronic devices from scan results;
- filtering the received signals from the scan results to extract and identify only the one or more water heaters based on information that distinguishes the one or more water heaters from among the information included in the signals received from the one or more water heaters and other electronic devices;
- displaying the one or more water heaters as connection destination candidates on a monitor of the mobile communication terminal based on the signal;

accepting a selection of any one of the one or more water heaters;

transmitting authentication information for establishing communication to the selected water heater and displaying the authentication information on the water heater;

accepting input of the authentication information; and establishing communication between the selected water heater and the mobile communication terminal based on the input authentication information and the authentication information transmitted to the water heater matching.

2. The non-transitory computer-readable recording medium recording the program according to claim 1, wherein the program further causes the mobile communication terminal to further execute prompting a connection with the one or more water heaters after communication with the water heater with which a communication has been established is cut off.

3. A water heater, the water heater comprising:

a transmitter for transmitting, to a mobile communication terminal, a broadcast signal including recognition information that distinguishes the water heater from among information included in signals received by the mobile communication terminal from a plurality of electronic devices including the water heater, the plurality of electronic devices being scanned by the mobile communication terminal using near field wireless communication, wherein the mobile communication terminal is configured to filter the signals received from scan results of the plurality of electronic devices, and extract and identify only the water heater based on the recognition information included in the broadcast signal;

a receiver for receiving, from the mobile communication terminal that has received the broadcast signal, authentication information for establishing a communication connection between the water heater specified by the recognition information and the mobile communication terminal;

a display for displaying the authentication information; and a controller for controlling an operation of the water heater based on an establishment of a communication connection with the mobile communication terminal.

* * * * *